United States Patent [19]

Bullock

[11] Patent Number: 4,491,037

[45] Date of Patent: Jan. 1, 1985

[54] SEAL ARRANGEMENT FOR DISENGAGEABLE REDUCTION DRIVE UNIT

[75] Inventor: Benton L. Bullock, New Palestine, Ind.

[73] Assignee: General Motors Corporation, Detroit, Mich.

[21] Appl. No.: 465,624

[22] Filed: Feb. 10, 1983

[51] Int. Cl.³ .................. F16H 3/44; F16H 57/10; F16H 57/00
[52] U.S. Cl. ........................ 74/785; 74/405; 384/130
[58] Field of Search ............ 74/750 R, 785, 405; 277/153; 308/3.5; 384/130

[56] References Cited

U.S. PATENT DOCUMENTS

| | | | |
|---|---|---|---|
| 2,939,346 | 6/1960 | McCarthy et al. | 74/785 X |
| 3,504,563 | 4/1970 | Polak | 74/405 |
| 3,504,564 | 4/1970 | Kell | 74/405 |
| 4,186,626 | 2/1980 | Chamberlain | 74/405 X |

FOREIGN PATENT DOCUMENTS

| | | | |
|---|---|---|---|
| 131311 | 11/1946 | Australia | 384/130 |
| 674757 | 11/1963 | Canada | 74/785 |
| 2339253 | 2/1974 | Fed. Rep. of Germany | 74/785 |
| 1051512 | 1/1954 | France | 384/130 |

*Primary Examiner*—George H. Krizmanich
*Assistant Examiner*—Dirk Wright
*Attorney, Agent, or Firm*—Saul Schwartz

[57] ABSTRACT

In a planetary gear type reduction drive unit having a sleeve shiftable between an extended torque transmitting position wherein both ends are supported and centered on an axis of rotation and a retracted non-torque transmitting position wherein one end is substantially unsupported and susceptible to unbalance oscillation when reverse torque is applied to the planetary gear set, an improved seal arrangement including a flexible lip seal which seals between a stationary portion of the unit and the sleeve in the extended and retracted positions of the latter and a pilot bearing adjacent the seal and engageable on the unsupported end of the sleeve in the retracted position of the latter to control runout and avoid oscillatory deflection of the lip seal.

3 Claims, 4 Drawing Figures

SEAL ARRANGEMENT FOR DISENGAGEABLE REDUCTION DRIVE UNIT

BACKGROUND OF THE INVENTION

1. Field of the Invention

This invention relates generally to final drive assemblies for track laying vehicles and, more particularly, to an improved seal arrangement for inhibiting lubricant loss and internal contamination in disengageable final drive assemblies.

2. Description of the Prior Art

In heavy track laying vehicles it is common to provide self contained, planetary gear type final drive units between the track sprockets and the corresponding transmission output shafts to increase the driving torque at the sprockets. In some situations, as when an engine failure occurs, it may be necessary to tow the track laying vehicle to a place of repair or to a transporter. It has been suggested that advantages accrue when such vehicles are towed with the transmission disconnected from the sprockets. Accordingly, in U.S. Pat. Nos. 3,504,563, issued Apr. 7, 1970 to J. C. Polak, and 3,504,564, issued Apr. 7, 1970 to N. B. Kell, both assigned to the assignee of this invention, disconnectable final drive units are proposed. In each of these units a torque transmitting sleeve is shiftable between engaged and disengaged positions to disconnect the sprocket from the transmission output shaft and relatively complex seal arrangements are provided to prevent internal contamination of the final drive assembly and loss of lubricant. A seal arrangement according to this invention represents an improvement in terms of simplicity, economy, and reliability over comparable heretofore known arrangements in similar environments.

SUMMARY OF THE INVENTION

The primary feature, then, of this invention is that it provides an improved seal arrangement in a disconnectable final drive unit. Another feature of this invention is that it provides an improved seal arrangement of simple and economical design adapted to reliably seal between a housing portion of the final drive unit and a shiftable torque transmitting member in both extended torque transmitting and retracted non-torque transmitting positions of the latter. Still another feature of this invention resides in the provision in the improved seal arrangement of a flexible seal member disposed between the torque transmitting member and the housing portion operable to inhibit passage of contamination and lubricant and in the provision of a simple pilot bearing adjacent the seal member operable to control runout of the torque transmitting member in the retracted position of the latter so that distortion of the seal member is avoided.

These and other features of this invention will be readily apparent from the following specification and from the drawings wherein.

Figure 1:
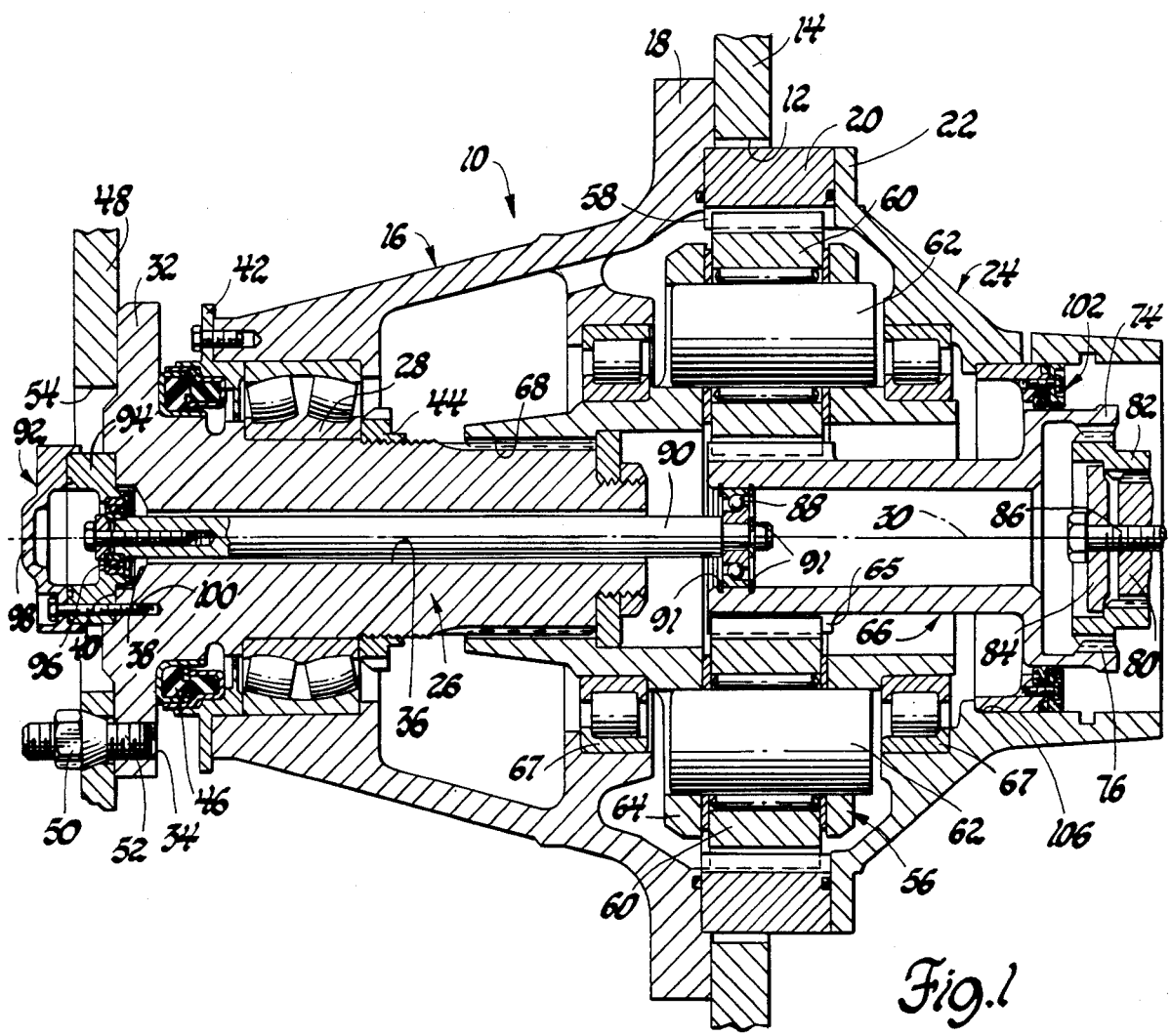
FIG. 1 is a sectional view of a final drive unit having an improved seal arrangement according to this invention and showing the shiftable, torque transmitting member in an extended torque transmitting position.
Figure 3:
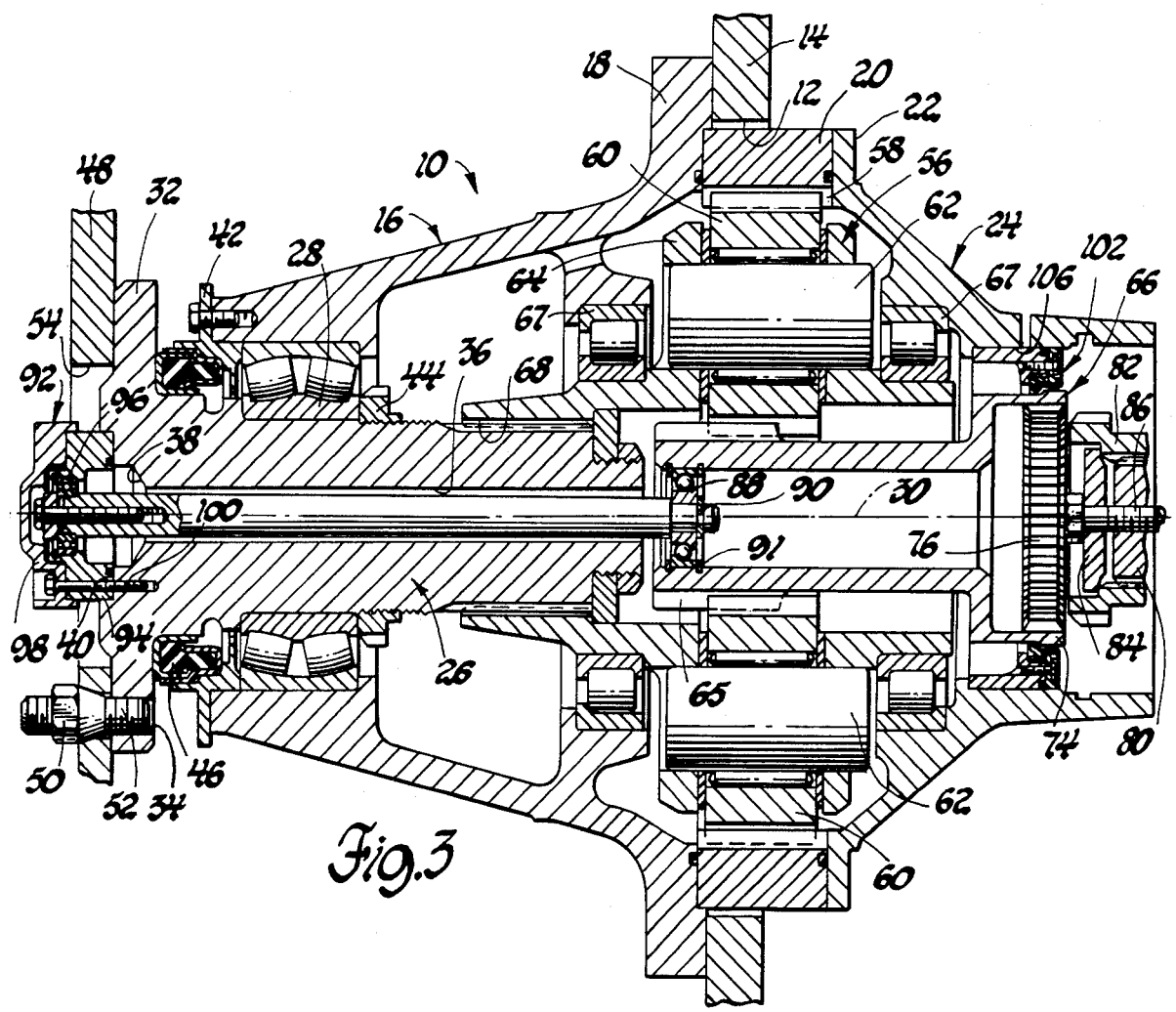
FIG. 3 is similar to FIG. 1 but showing the shiftable, torque transmitting member in a retracted non-torque transmitting position.

Referring now to FIGS. 1 and 3 of the drawings and describing the general environment in which the improved seal arrangement according to this invention finds utility, a left side final drive unit designated generally 10 is illustrated disposed in a circular opening 12 in a vertical wall 14 which forms the left vertical wall of the hull of the track laying vehicle, not shown. An identical final drive unit, not shown, is disposed on the opposite side of the hull and would, if illustrated, be a mirror image of the unit 10 which, for simplicity will be the only one described. The final drive unit 10 includes a generally conical outer shell 16 having an integral flange 18 around the base thereof. The flange 18 is bolted to the vertical wall 14 around the opening 12. A spacer ring 20 is disposed generally within the opening 12 and is captured between the base of outer shell 16 and an integral annular flange 22 of an inner shell 24. An annular array of bolts, not shown, extend through appropriate apertures in the flange 22 and the spacer ring 20 and thread into corresponding apertures in the outer shell 16 so that the outer shell, the spacer ring, and the inner shell form a rigid housing mounted on the vertical wall 14.

With continued reference to FIGS. 1 and 3, a sprocket drive shaft 26 is supported on the outer shell 16 by a bearing assembly 28 for rotation about a transverse axis 30 of the track laying vehicle. The shaft 26 has an integral flange 32 with an annular array of threaded holes therein, only a single hole 34 being shown in FIGS. 1 and 3, and a main bore 36 extending longitudinally through the shaft with a counterbore 38 and a spot faced annular surface 40 around the counterbore at the flange end. A retainer 42 is bolted to the outer shell 16 and holds the bearing assembly 28 against a collar 44 on the shaft 26 and a seal assembly 46, forming no part of this invention, is disposed between the retainer 42 and the shaft 26 to seal the outboard end of final drive unit. A sprocket hub schematically illustrated at 48 is attached to the flange 32 by an annular array of lug nuts on studs in the holes 34, only a single nut 50 on a stud 52 being shown in FIGS. 1 and 3. A hub opening 54 in the sprocket hub 48 registers with the transverse axis 30 to provide clearance at the center of the shaft 26.

Within the final drive unit 10, a planetary reduction gear set 56 includes a ring gear 58 defined by a plurality of gear teeth at the internal cylindrical surface of spacer ring 20, a plurality of planet gears 60 meshing with the ring gear 58 and rotatable on a corresponding plurality of pins 62 supported on a carrier 64, and a sun gear 65 formed integrally with and at the laterally outermost or outboard end of a shiftable, torque transmitting sleeve 66. The carrier 64 is rotatably supported by a pair of roller bearings 67 disposed between the carrier and the rigid housing formed by the inner and outer shells 16 and 24 and is connected to the sprocket drive shaft 26 through a spline connection 68 for rotation as a unit with the latter.

The sleeve 66 includes an enlarged cylindrical drum portion 74 at its laterally innermost or inboard end opposite the sun gear 65. The drum portion 74 has a plurality of internal splines 76 and a cylindrical outer surface 77 with a raised bearing surface 78 adjacent the inboard edge of the sleeve, FIGS. 2 and 4. A transmission shaft 80 is driven by the main transmission of the vehicle and carries an adapter 82 at its outboard end, the adapter 82 being retained on the shaft 80 by a plate 84 and bolt 86 and rotatable as a unit with the transmission shaft. The sleeve 66 is shiftable between an extended torque transmitting position, FIGS. 1 and 2, wherein the splines 76 on the sleeve engage corresponding splines on the adapter 82 so that the sleeve 66 rotates as a unit with the transmission shaft 80, and a retracted non-torque transmitting position, FIGS. 3 and 4, wherein the splines 76 are separated from the corresponding splines on the adapter 82 so that the sleeve 66 is isolated from the transmission shaft 80.

As seen best in FIGS. 1 and 3, a bearing 88 is disposed between the sleeve 66 and a control shaft 90 extending through the main bore 36 of the sprocket drive shaft 26. A plurality of retaining rings 91 between the bearing 88 and the sleeve 66 and between the bearing 88 and the control shaft 90 operate to connect the sleeve and the control shaft for unitary shiftable movement while permitting relative rotation therebetween. At its laterally outermost or outboard end, the control shaft 90 is connected to the shaft 26 through a representative lateral positioning arrangement 92 identical to the one shown and described in the aforementioned U.S. Pat. No. 3,504,563. While reference may be made to that patent for a full and complete description of the details of the positioning arrangement, the latter generally includes a reversible spacer 94, a bearing 96 between the spacer and the control shaft 90, and a cap 98. The spacer 94 seats generally within or over the counterbore 38 and on the spot faced annular surface 40 of the shaft 26 in either a first position, FIG. 1, locating the control shaft in a laterally innermost position corresponding to the extended position of the sleeve 66 or a second position, FIG. 3, locating the control shaft 90 in a laterally outermost position corresponding to the retracted position of the sleeve 66. The spacer is retained in either of its two positions by an annular array of bolts which rigidly connect both the cap and the spacer to the shaft 26, only a single bolt 100 being shown in FIGS. 1 and 3. The bearing 96 operates to prevent relative shiftable movement while permitting relative rotation about the transverse axis 30 between the control shaft 90 and the sprocket drive shaft 26.

In its extended position, the sleeve 66 has its inboard end on and centered with respect to transverse axis 30 by the adapter 82 on the transmission shaft 80. Similarly, in the extended position of the sleeve the planet gears 60, which are symmetrically disposed around the sun gear 65, support and center the outboard end of the sleeve 66. However, while the planet gears 60 continue to engage the sun gear in the retracted position of the sleeve and thus continue to support and center the outboard end of the latter, the inboard end of the sleeve is effectively unsupported. Thus, when the vehicle is towed, and the sleeve 66 rotated at relatively high rotational velocity by the sprocket 48 through the shaft 26 and the planetary gear set 56, any unbalance in the sleeve operates to oscillate the drum portion 74 about the axis 30. A seal arrangement according to this invention and designated generally 102 disposed between the inner shell 24 and the drum portion 74 of the sleeve operates in both the extended and the retracted positions of the sleeve to inhibit the passage of contaminants or lubricants while controlling unbalance oscillations of the sleeve to prolong the life of the seal.

Figure 2:
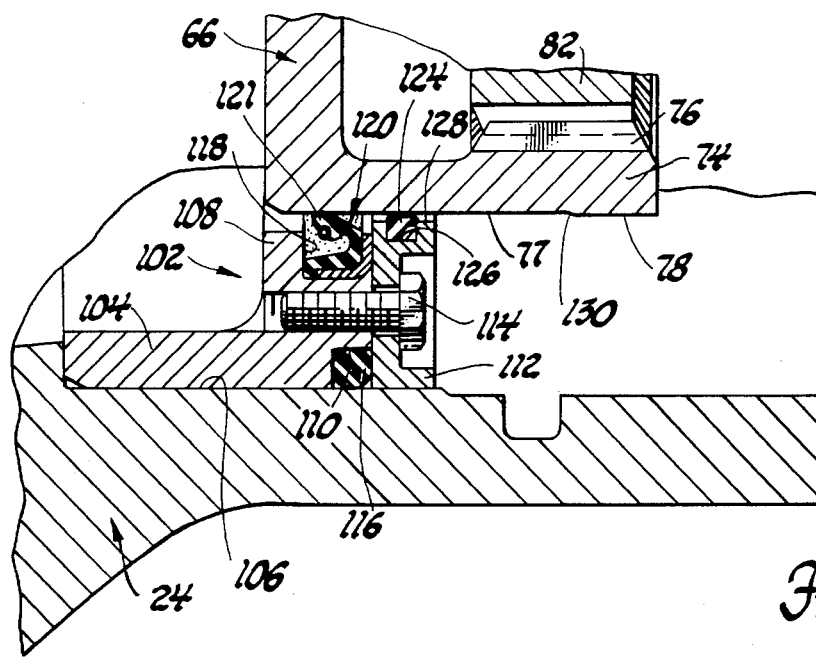
FIG. 2 is an enlarged view of a portion of FIG. 1 showing, in particular, the improved seal arrangement according to this invention.
Figure 4:
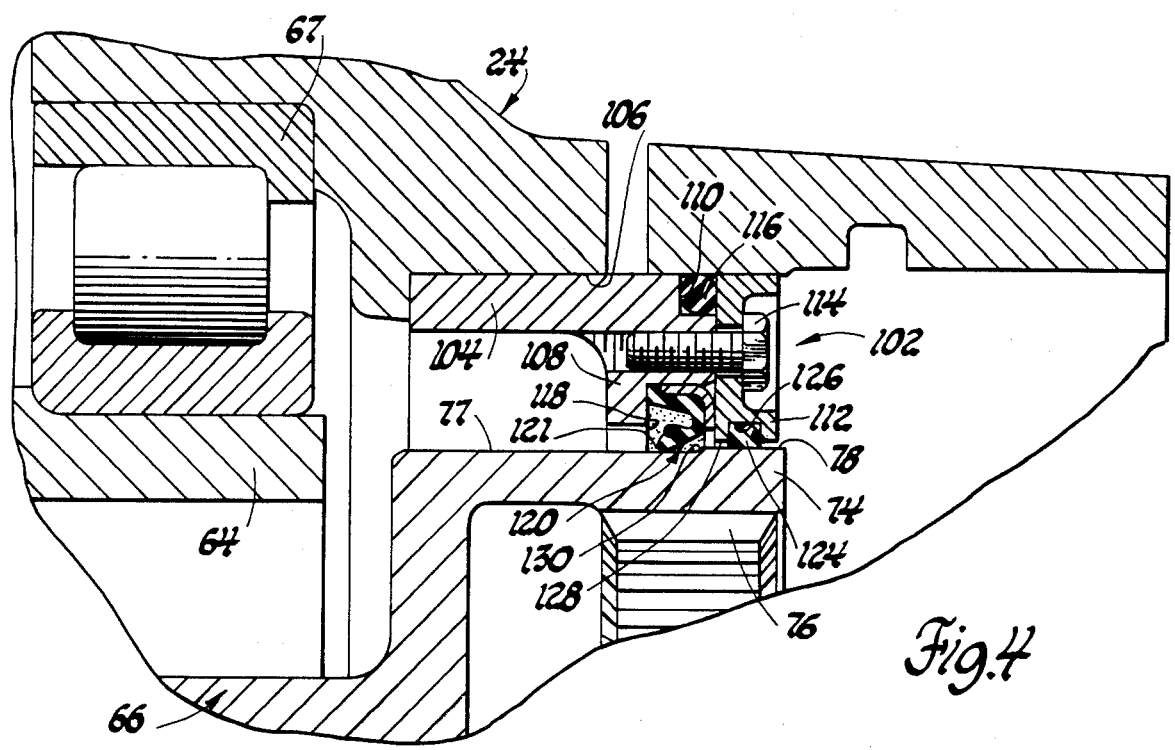
FIG. 4 is an enlarged view of a portion of FIG. 3 showing, in particular, the improved seal arrangement according to this invention.

Referring particularly to FIGS. 2 and 4, the seal arrangement 102 includes a support ring 104 press fitted or otherwise rigidly attached to the inner shell 24 at an internal cylindrical surface 106 of the latter centered around the transverse axis 30. The support ring 104 has a radially depending annular flange 108 which surrounds the drum portion 74 of the sleeve and an annular groove 110 adjacent the internal surface 106. An annular retainer 112 is rigidly attached to the support ring 104 by an array of bolts, only one bolt 114 being shown in FIGS. 2 and 4 and cooperates with the annular groove 110 in capturing a conventional O-ring type seal 116 which prevents the passage of fluids between the surface 106 and the support ring 104. In addition, the retainer 112 cooperates with the depending flange 108 in defining a seal recess 118 in which is disposed a conventional seal 120 having a resiliently biased flexible lip 121 bearing against the cylindrical surface 77 of the drum portion 74 to prevent passage of contaminants or lubricant between the drum portion and the support ring 104. A piloting bearing ring 124 fabricated of low friction plastic material is disposed in a radially inwardly facing groove 126 in an inner cylindrical surface 128 of the retainer 112 centered about axis 30 and projects slightly beyond surface 128. The bearing ring 124 is an assembly of two semicircular halves, the ends of which are fastened together after installation by pins which project through appropriate openings in retainer 112 to also prevent rotation of the ring. The bearing ring 124 slidably engages the cylindrical raised bearing surface 78 on the drum portion 74 of the sleeve in the retracted position of the latter while being slightly spaced from or very lightly contacting the cylindrical surface 77 in the extended position of the sleeve.

During normal vehicle operation the sleeve 66 is in the extended position transmitting torque from the transmission shaft 80 to the planetary gear set 56. In addition, the flexible lip 121 of seal 120 engages the cylindrical surface 77 to prevent passage of contaminants and lubricants as the sleeve rotates relative to the inner shell 24 while the bearing ring 124 is slightly spaced from or only very lightly contacts the cylindrical surface 77. When a towing situation arises, the lateral positioning arrangement 92 is employed to shift the sleeve 66 from its extended to its retracted position. As the sleeve approaches its retracted position a shoulder 130 between the cylindrical surface 77 and the bearing surface 78 cams the piloting bearing ring 124 on to the bearing surface. Since the retainer 112 is centered about the axis 30, the piloting bearing ring 124 operates to likewise center the otherwise unsupported inboard end of sleeve 66 about the same axis while flexible lip 121 of seal 120 continues to sealingly engage cylindrical surface 77. With its inboard end thus supported and aligned, there is little or no runout of the sleeve during towing so that undesirable oscillatory flexure of seal lip is avoided.

The embodiments of the invention in which an exclusive property or privilege is claimed are defined as follows:

1. In a planetary reduction drive unit for transmitting torque from a transmission shaft to an output member and including an output drive shaft connected to said output member and rotatable about an axis of said unit, a planet carrier rotatable with said output drive shaft about said axis, a plurality of planet gears rotatably supported on said carrier and engaging a fixed ring gear, a sleeve shiftable along said axis between an extended position wherein a first end of said sleeve drivingly engages said transmission shaft and is supported by the latter and centered about said axis and a retracted position wherein said first end is remote from said transmission shaft and unsupported, and means forming a sun gear on said sleeve at a second end thereof engaging said planet gear in each of said extended and said retracted positions of said sleeve, said planet gears supporting said second end and centering the latter about said axis, the improvement comprising, seal means disposed between said sleeve generally adjacent said first end and a relatively stationary portion of said unit operative to seal against said sleeve in each of said extended and said retracted positions of the latter, and pilot bearing means on said relatively stationary portion adjacent said seal means and engageable on said sleeve adjacent said first end thereof when said sleeve is in said retracted position to rotatably support and center said inboard end about said axis for runout control.

2. In a planetary reduction drive unit for transmitting torque from a transmission shaft to an output member and including an output drive shaft connected to said output member and rotatable about an axis of said unit, a planet carrier rotatable with said output drive shaft about said axis, a plurality of planet gears rotatably supported on said carrier and engaging a fixed ring gear, a sleeve shiftable along said axis between an extended position wherein a first end of said sleeve drivingly engages said transmission shaft and is supported by the latter and centered about said axis and a retracted position wherein said first end is remote from said transmission shaft and unsupported, and means forming a sun gear on said sleeve at a second end thereof engaging said planet gears in each of said extended and said retracted positions of said sleeve, said planet gears supporting said second end and centering the latter about said axis, the improvement comprising, seal means disposed between said sleeve generally adjacent said first end and a relatively stationary portion of said unit operative to seal against said sleeve in each of said extended and said retracted positions of the latter, means forming a raised bearing surface on said sleeve at said first end, a retainer disposed on said relatively stationary portion adjacent said seal means and defining an inner cylindrical surface centered about said axis, and pilot bearing means disposed on said retainer at said inner cylindrical surface engageable on said raised bearing surface of said sleeve in said retracted position of the latter to rotatably support and center said first end about said axis for runout control.

3. In a planetary reduction drive unit for transmitting torque from a transmission shaft to an output member and including an output drive shaft connected to said output member and rotatable about an axis of said unit, a planet carrier rotatable with said output drive shaft about said axis, a plurality of planet gears rotatably supported on said carrier and engaging a fixed ring gear, a sleeve shiftable along said axis between an extended position wherein a first end of said sleeve drivingly engages said transmission shaft and is supported by the latter and centered about said axis and a retracted position wherein said first end is remote from said transmission shaft and unsupported, and means forming a sun gear on said sleeve at a second end thereof engaging said planet gears in each of said extended and said retracted positions of said sleeve, said planet gears supporting said second end and centering the latter about said axis, the improvement comprising, means defining an outer cylindrical surface on said sleeve generally adjacent said first end, means defining a raised bearing surface on said sleeve at said first end, a support ring rigidly connected to a stationary portion of said unit around said sleeve and including a radially depending flange projecting toward said sleeve, an annular retainer having an inner cylindrical surface, means rigidly attaching said retainer to said support member in longitudinally spaced relation to said flange so that said retainer cooperates with said flange in defining a seal mounting recess and with said inner cylindrical surface centered around said axis, an annular seal disposed in said recess including a flexible lip engageable on said outer cylindrical surface during rotation of said sleeve in said extended and said retracted positions of the latter to inhibit passage of contaminants and lubricants, and pilot bearing means disposed on said retainer at said inner cylindrical surface engageable on said raised bearing surface of said sleeve in said retracted position of the latter to rotatably support and center said first end about said axis for runout cont

* * * * *

UNITED STATES PATENT AND TRADEMARK OFFICE
CERTIFICATE OF CORRECTION

PATENT NO. : 4,491,037
DATED : January 1, 1985
INVENTOR(S) : Benton L. Bullock

It is certified that error appears in the above-identified patent and that said Letters Patent is hereby corrected as shown below:

Column 1, line 4, after the title but before "Background of the Invention", insert a paragraph -- The invention herein described was made in the course of work under a contract or subcontract thereunder with the Department of Defense. --.

Column 6, line 44, Claim 3, the word "cont" should read -- control --.

Signed and Sealed this

Eleventh Day of June 1985

[SEAL]

Attest:

DONALD J. QUIGG

Attesting Officer          Acting Commissioner of Patents and Trademarks